2,744,333

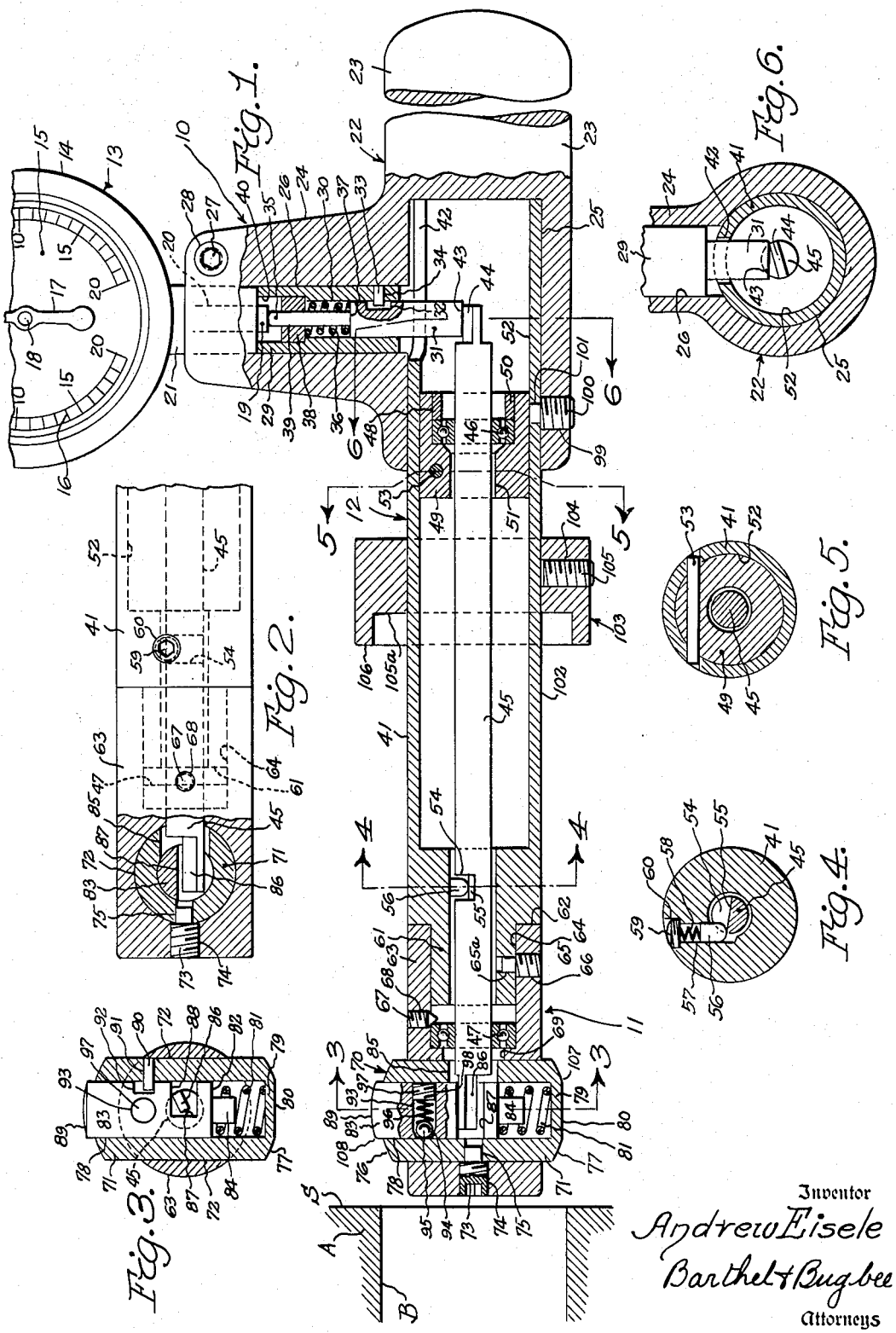
May 8, 1956 — A. EISELE — 2,744,333
BORE GAUGING INSTRUMENT
Filed Aug. 30, 1951
Inventor
Andrew Eisele
Barthel & Bugbee
Attorneys

United States Patent Office 2,744,333
Patented May 8, 1956

BORE GAUGING INSTRUMENT

Andrew Eisele, Detroit, Mich.

Application August 30, 1951, Serial No. 244,295

4 Claims. (Cl. 33—178)

This invention relates to instruments for gauging the diameters of bores.

One object of this invention is to provide a bore gauging instrument having interchangeable measuring heads for gauging different diameters of bores and also having interchangeable fixed and movable measuring pin assemblies enabling a given measuring head to be adapted quickly and easily to the measuring of different diameters of bores.

Another object is to provide a bore gauging instrument of the foregoing character having means for urging the movable measuring pin against the side wall of the bore in which it is mounted, thereby preventing wobbling of the measuring pin during measurement and insuring accuracy of repeated measurements.

Another object is to provide a bore gauging instrument of the foregoing character wherein improved means is provided for converting the reciprocatory motion of the movable measuring pin into rotary motion of a motion-transmitting rod or shaft, which in turn transmits the motion to a dial indicator plunger.

Another object is to provide a bore gauging instrument of the foregoing character having improved means for preventing errors due to backlash of the rotary motion-transmitting rod or shaft.

Another object is to provide a bore gauging instrument of the foregoing character wherein the movable measuring pin reciprocates in a bore within the fixed measuring pin, the latter having a flat spot in an end which, like the end of the movable measuring pin, has a spherical surface with a radius of curvature slightly smaller than the radius of curvature of the bore to be measured.

Another object is to provide a bore gauging instrument of the foregoing character which is provided with an adjustable depth stop of improved construction.

Other objects and advantages of the invention will become apparent during the course of the following description of the accompanying drawings, wherein:

Figure 1 is a central longitudinal section, partly in side elevation, of a bore gauging instrument according to one form of the invention with a portion of the handle omitted in order to show the instrument on the largest possible scale;

Figure 2 is a fragmentary top plan view, partly in central horizontal section, of the left-hand or measuring head end of the bore gauging instrument shown in Figure 1;

Figure 3 is a cross section through the measuring head taken along the line 3—3 in Figure 1;

Figure 4 is a cross-section taken along the line 4—4 in Figure 1, showing the backlash takeup device for preventing errors due to backlash in the motion-transmitting rod;

Figure 5 is a cross-section taken along the line 5—5 in Figure 1; and

Figure 6 is a cross-section taken along the line 6—6 in Figure 1.

Referring to the drawing in detail, Figure 1 shows a bore gauging instrument, generally designated 10, according to the invention as including a measuring head, generally designated 11 fitted to a motion-transmitting unit, generally designated 12, having a dial indicator, generally designated 13, of conventional construction mounted thereon. The dial indicator 13 has a cylindrical casing 14 with the usual rotatable graduated dial 15 provided with graduations 16 with which a needle 17 registers. The needle 17 is mounted upon a needle shaft 18 which is operatively connected through conventional gearing to a plunger 19 mounted in and extending through a bore 20 in the stem 21 of the dial indicator 13.

The motion-transmitting unit 12 includes a handle, generally designated 22, having arms 23 and 24 arranged approximately at right angles to one another, the arm 23 being substantially coaxial with the motion-transmitting unit 12 and the arm 24 being transverse thereto. The arms 23 and 24 have bores 25 and 26 of different sizes disposed with their axes at right angles to one another and communicating with one another. The bore 26 is of substantially the same size as the dial indicator stem 21 and its upper end serves as a socket to receive the latter. The arm 24 is split (not shown) adjacent the upper or outer end of the bore 26 and a clamping screw 27 is provided in a threaded bore 28 for clamping the stem 21 in the upper end of the bore 26.

Also seated in the bore 26 and disposed near the lower or inner end thereof is a hollow rod or sleeve 29 having a bore 30 therein reciprocably receiving a plunger 31 which is notched as at 32 to receive a pin 33 mounted in a transverse hole 34 in the hollow rod or sleeve 29 for limiting the reciprocation of the rod 31 while retaining it in position. The plunger 31 is provided with a reduced diameter extension 35 which is surrounded by a helical spring 36 urging the plunger 31 downward or inward. One end of the spring 36 abuts the annular shoulder 37 between the plunger 31 and its reduced diameter extension 35, whereas the opposite end abuts a washer or closure plug 38 which is bored as at 39 for the passage of the reduced diameter portion 35. The upper end of the reduced diameter portion 35 is rounded and engages the lower end of the dial indicator plunger 19. The washer or closure plug 38 is seated in a counterbore 40 at the upper or outer end of the bore 26.

Seated in the bore 25 in the handle 22 is a tubular casing 41 having an elongated slot 42 (Figures 1 and 6) through which the plunger 31 projects. The lower end 43 of the plunger 31 is flattened and engages one edge of the cutaway flattened end portion 44 of a rotary motion transmitting rod 45 mounted in anti-friction bearing units 46 and 47 at its opposite ends. The anti-friction bearing unit 46 is mounted in a counterbore 48 in a plug 49 by means of a retaining ring 50, the plug 49 having a bore 51 for the passage of the motion-transmitting rod 45. The plug 49 in turn is held in position within a bore 52 inside the casing 41 by means of a pin 53 passing through both (Figure 5). The motion-transmitting rod 45 is slotted diametrically as at 54 to provide a diametral surface 55 engaged by a round-ended pin 56 reciprocably mounted in an offset bore 57 (Figure 4) in the casing 41 and urged inwardly by a spring 58 mounted in the bore 57 and retained therein by a screw plug 59 threaded into the threaded counterbore 60 at the outer end of the offset bore 58.

The forward end of the casing 41 is provided with a reduced diameter portion 61 forming a shoulder 62 against which the neck or hollow stem portion 63 of the measuring head 11 abuts. The reduced diameter portion 61 fits into the counterbore 64 in the hollow stem 63, these parts being removably held together by a stud 65 threaded into a transverse threaded hole 66 in the stem 63 (Figure 1). The second anti-friction bearing unit 47 is mounted in the end of the counterbore 64 and is held in position by a set screw 67 threaded into a transverse threaded hole 68 in the stem 63. Beyond the counterbore 64, the stem 63 is provided with a bore 69 of reduced diameter through which the motion-transmitting rod 45 projects into the interior of the measuring pin assembly, generally designated 70.

The measuring pin assembly 70 is housed in a cup-shaped or tubular fixed measuring pin 71 (Figures 1 and 3) which in turn is mounted in a transverse bore 72 (Figures 2 and 3) passing diametrically through the stem 63 of the measuring head 11 and held in position by a stud 73 threaded into the longitudinal threaded hole 74 in the end of the stem 63 and having its unthreaded end projecting into a transverse hole 75 in the fixed measuring pin 71.

The tubular fixed measuring pin 71 is provided at its opposite ends with annular surfaces 76 and 77 respectively of spherical curvature having a radius of curvature which is slightly shorter than the radius of curvature of the bore B to be gauged. The bore B is of course located in any article A, such as an automobile engine cylinder block. Such cylinder blocks are manufactured in large quantities in the automobile factories and the accurate gauging of successive cylinder blocks is a laborious task if sufficient accuracy is to be obtained. The present bore gauging instrument achieves both accuracy and speed of measurement.

The fixed measuring pin 71 has a bore or socket 78 closed at one end by an end wall 79 (Figures 1 and 3) having a flattened outer surface 80 located inside the annular surface 77 of spherical curvature. Seated in the bore or socket 78 with one end abutting the pin end wall 79 is a helical spring 81, the opposite end of which abuts the inner end 82 of a movable measuring pin 83 which is reciprocably mounted within the bore or socket 78. Projecting inward from the end 82 is a reduced diameter extension 84 (Figure 3) which holds the spring 81 in position.

The tubular fixed measuring pin 71 is provided in one wall with a bore 85 through which the motion-transmitting rod 45 projects into the bore or socket 78, where it is provided with a cutaway flattened sharp-edged end portion 86. The end portion 86 is approximately the width of the radius of the rod 45 (Figure 3) in contrast to the diametral width of the cutaway flattened sharp-edged end portion 44 at the opposite end of the rod 45 (Figure 6). The cutaway flattened end portion 86 extends only partway across the diameter of the rod 45 in order to enable it to enter a recess, notch or transverse groove 87 in the side of the movable measuring pin 83 where its edge engages one of the side walls 88 thereof. A flattened end portion which is the full width of the rod 45, such as the portion 44 on the opposite end, would not enter the recess. The outer end of the pin 83 has a rounded surface 89 of spherical curvature, it being given a radius of curvature which is approximately the same as the standard radius of curvature of the bore to be measured, so that line contact with a bore B of correct radius is made by the end 89 of the pin 83.

The reciprocation of the movable measuring pin 83 is limited by a pin 90 (Figure 3) seated in a transverse hole 91 in the tubular fixed measuring pin 71. The inner end of the pin 80 projects into an elongated slot 92, the opposite side walls of which serve as stop surfaces for engagement with the pin 90. In order to prevent wobble of the movable measuring pin 83, the latter is provided with a diametral hole 93 (Figure 1) with a tapered end portion 94 which serves as a seat for a ball 95. The ball 95 is urged into the conical or tapered seat 94 and against the surface of the bore 78 by a helical spring 96, the opposite end of which abuts and is held in place by a screw plug 97 threaded into the threaded outer portion 98 of the hole 93. The spring 96 causes the ball 95 to urge the pin 83 against one side of the bore 78, thereby preventing wobble of the pin 89 even though considerable wear occurs, and consequently enabling accurate measurement to be repeatedly made.

The handle 22 is provided with a transverse threaded radial hole 99 extending into the bore 25 which receives the end of the casing 41 (Figure 1). Threaded into the hole 99 is a screw plug 100, the inner end of which projects into a hole 101 in the casing 41 and holds the handle 22 in assembly with the casing 41. Slidably mounted on the outer surface 102 of the casing 41 is a depth stop 103 in the form of a collar having a radial threaded hole 104 adapted to receive a set screw 105 for locking the stop 103 in any desired position along the casing 41. The stop 103 is provided with a socket 105a in one end which gives an annular contact surface 106 for engagement with the surface S surrounding the bore B in the article A to be gauged.

In the operation of the invention, let it be assumed that a bore B of a certain diameter is to be gauged, such as the cylinder bores of an automobile engine cylinder block which is being produced in large quantities by mass production and assembly line methods. Let it be assumed, therefore, that a measuring head 11 has been selected which is suitable for measuring the bore B and which has been mounted upon the reduced diameter portion 61 of the casing 41 and secured in position by the set screw 65. It will be understood that the measuring head 11 may be provided in different sizes according to different diameters of bores B to be gauged, and that the measuring head 11 itself may be used for receiving any one of a number of measuring pin assemblies 70 according to the precise diameter of the bore to be gauged. The operator sets the depth stop 103 at the desired depth in the bore B below the surface A at which it is desired to take the deepest measurement of the bore B. The dial 15 with its movable graduations 16 is rotated until the needle 17 lies opposite the zero on the graduations 16 when the measuring head 11 is in a bore B of the exact diameter theoretically desired. The graduations 16 will then measure the fluctuations in the diameters of successive bores B which are gauged, according to the thousandths or ten thousandths of an inch oversize or undersize, depending upon the tolerances employed.

The operator then pushes the measuring head 11 into the bore B, the side walls of which press the movable measuring pin 83 inward against the urge of the spring 81 (Figure 1). At the same time, contact is made by the sharp edge 107 which serves as the boundary between the spherical end surface 77 and the flatter central spot 80 at the closed end of the fixed measuring pin 71. Contact with the opposite side of the bore B is made by the cross-arc of the rounded end 89 of the movable measuring pin 83. This contact enables the operator to place the axes of his fixed and movable measuring pins 71 and 83 accurately in coincidence with the diameter of the bore B to be measured, reducing errors of measurement to a minimum.

As the pin 83 moves inward or outward, depending upon the diameter of the bore B to be measured, the motion is transmitted to the rod 45 by the engagement of the groove side wall 88 with the edge of the cutaway flattened portion 86 (Figure 3), rotating the rod 45. The rotation of the rod 45 is transmitted to the plunger 31 by the engagement of the edge of the cutaway flattened portion 44 at the opposite end of the rod 45 with the end 43 of the plunger 31, reciprocating the latter. The reciprocation of the plunger 31 is transmitted to the dial indicator 13 by the engagement of the plunger extension 35 with the dial indicator plunger 19. The resulting motion of the dial indicator plunger 19 is transmitted through the dial indicator mechanism to the needle shaft 18 and needle 17, causing the end of the needle 17 to indicate the true diameter of the bore B in terms of its deviation from the standard diameter thereof.

As previously stated, the spring-urged ball 95 (Figure 1) prevents wobble of the movable measuring pin 83 during measurements, thereby insuring the accuracy of successive measurements, whereas the action of the spring-urged pin 56 (Figure 4) takes up backlash in the motion-transmitting rod 45. Accurate rotation of the latter is insured by the anti-friction bearing assemblies 46 and 47 located adjacent its opposite ends.

In the event that it is desired to use the instrument 10 in measuring bores B of a different diameter than the standard diameter and outside of the scope of the measuring head 11 being employed at the time, the measuring head 11 is interchanged with another measuring head adapted for the different standard diameter by removing the retaining stud 65. The measuring head 11 is then removed as a unit and the new measuring head 11 substituted for it. To convert one measuring head 11 into another of a different measuring range, it is merely necessary to replace the measuring pin assembly 70 of one range in use with another measuring pin assembly 70 of the proper range for the new measurements to be made.

What I claim is:

1. A measuring head for a bore gauge of the type having an elongated hollow casing containing motion-transmitting mechanism operatively connected to a dial indicator, said measuring head comprising a head body having a longitudinal bore therein configured to receive the end of said casing and having a transverse bore therein disposed with its axis at right angles to said longitudinal bore and communicating with said longitudinal bore, said transverse bore extending entirely through said body from side to side thereof, a fixed measuring member mounted in said transverse bore and extending entirely through said body from side to side thereof, said fixed measuring member having a smaller bore therein coaxial with said transverse bore, a movable measuring member reciprocably mounted in said smaller bore with its outer end projecting therefrom and having a contact portion therein adapted to operatively engage said motion-transmitting mechanism, said fixed measuring member having an opening in the side thereof communicating with said contact portion and receiving said motion-transmitting mechanism, said measuring members having bore-contacting portions on their outer ends, said movable measuring member having a cross bore therein disposed transversely to its axis of reciprocation, and a yieldingly-urged lateral motion take-up device reciprocably mounted in said cross bore and yieldingly engaging the side wall of said smaller bore in said fixed measuring member.

2. A measuring head for a bore gauge of the type having an elongated hollow casing containing motion-transmitting mechanism operatively connected to a dial indicator, said measuring head comprising a head body having a longitudinal bore therein configured to receive the end of said casing and having a transverse bore therein disposed with its axis at right angles to said longitudinal bore and communicating with said longitudinal bore, said transverse bore extending entirely through said body from side to side thereof, a fixed measuring member mounted in said transverse bore and extending entirely through said body from side to side thereof, said fixed measuring member having a socket therein with a side wall of substantially cylindrical configuration disposed coaxial with said transverse bore, and a movable measuring member reciprocably mounted in said socket with its outer end projecting therefrom and having a substantially-cylindrical side surface engaging said side wall of said socket substantially throughout the entire length of said movable measuring member, said movable measuring member having a contact portion therein adapted to operatively engage said motion-transmitting mechanism, said fixed measuring member having an opening in the side thereof communicating with said contact portion and receiving said motion-transmitting mechanism, said measuring members having bore-contacting portions on their outer ends.

3. A bore-gauging instrument for use with a dial indicator, comprising a casing having a passageway therethrough, a rotary motion-transmitting element rotatably mounted in said passageway and having a flattened cutaway portion at one end thereof extending only partway thereacross and having a sharp contact edge thereon, a measuring head body mounted on said casing and having a longitudinal bore therein adapted to receive said flattened cutaway portion and having a transverse bore therein disposed with its axis at right angles to said longitudinal bore and communicating with said longitudinal bore, a fixed measuring member mounted in said transverse bore and coextensive therewith, said fixed measuring member also having a bore therein with its axis disposed at right angles to said longitudinal bore, and a movable measuring member mounted in said fixed measuring member bore and having a recess in the side thereof containing a contact area operatively engaging said contact edge of said flattened cutaway portion.

4. A bore-gauging instrument for use with a dial indicator, comprising a casing having a passageway therethrough, a rotary motion-transmitting element rotatably mounted in said passageway and having a flattened cutaway portion at one end thereof extending only partway thereacross and having a sharp contact edge thereon, a measuring head body mounted on said casing and having a longitudinal bore therein adapted to receive said flattened cutaway portion and having a transverse bore therein disposed with its axis at right angles to said longitudinal bore and communicating with said longitudinal bore, a fixed measuring member mounted in said transverse bore and coextensive therewith, said fixed measuring member also having a bore therein with its axis disposed at right angles to said longitudinal bore, and a movable measuring member mounted in said fixed measuring member bore and having a notch in the side thereof, one wall of said notch having a contact area operatively engaging said contact edge of said flattened cutaway portion.

References Cited in the file of this patent

UNITED STATES PATENTS

| | | |
|---|---|---|
| 1,664,535 | Bartholdy | Apr. 3, 1928 |
| 1,804,383 | Litterio | May 5, 1931 |
| 2,363,165 | Vierling | Nov. 21, 1944 |
| 2,472,139 | Aldeborgh et al. | June 7, 1949 |
| 2,484,697 | Eisele | Oct. 11, 1949 |
| 2,524,984 | Manvers | Oct. 10, 1950 |
| 2,546,154 | Gardner | Mar. 27, 1951 |

FOREIGN PATENTS

| | | |
|---|---|---|
| 838,409 | France | Mar. 6, 1939 |
| 616,542 | Great Britain | Jan. 24, 1949 |